United States Patent
Ekambaram et al.

(10) Patent No.: US 10,032,009 B2
(45) Date of Patent: Jul. 24, 2018

(54) MOTION INFORMATION FILTERING

(71) Applicant: International Business Machines Corporation, Armonk, NY (US)

(72) Inventors: Vijay Ekambaram, Chennai (IN); Vikas Joshi, Bangalore (IN); Pratyush Kumar, Chennai (IN)

(73) Assignee: International Business Machines Corporation, Armonk, NY (US)

( * ) Notice: Subject to any disclaimer, the term of this patent is extended or adjusted under 35 U.S.C. 154(b) by 24 days.

(21) Appl. No.: 15/227,783

(22) Filed: Aug. 3, 2016

(65) Prior Publication Data

US 2018/0039765 A1    Feb. 8, 2018

(51) Int. Cl.
| | |
|---|---|
| *G06F 21/00* | (2013.01) |
| *G06F 21/31* | (2013.01) |
| *G06F 17/30* | (2006.01) |
| *G06F 21/62* | (2013.01) |

(52) U.S. Cl.
CPC ...... *G06F 21/316* (2013.01); *G06F 17/30598* (2013.01); *G06F 21/6245* (2013.01)

(58) Field of Classification Search
CPC .............. G06F 21/316; G06F 21/6245; G06F 17/30598
USPC .......................................................... 726/17
See application file for complete search history.

(56) References Cited

U.S. PATENT DOCUMENTS

| | | | |
|---|---|---|---|
| 9,246,944 B1 | 1/2016 | Chen | |
| 2012/0133482 A1* | 5/2012 | Bhandari | ........... G07C 9/00103 340/5.2 |
| 2016/0006744 A1* | 1/2016 | Du | ........................ H04L 63/102 726/4 |
| 2016/0058337 A1 | 3/2016 | Blahnik et al. | |
| 2016/0065984 A1* | 3/2016 | Nejat | ..................... H04N 5/144 348/231.3 |

OTHER PUBLICATIONS

Chakraborty, S., Raghavan, K. R., Johnson, M. P., & Srivastava, M. B. (Feb. 2013). A framework for context-aware privacy of sensor data on mobile systems. In Proceedings of the 14th Workshop on Mobile Computing Systems and Applications (p. 11). ACM.*
He Wang et al., "MoLe: Motion Leaks through Smartwatch Sensors", MobiCom'15, Sep. 7-11, 2015, Paris, France, 12 pages, ACM Digital Library.

(Continued)

*Primary Examiner* — Syed Zaidi
(74) *Attorney, Agent, or Firm* — Ference & Associates LLC

(57) ABSTRACT

One embodiment provides a method, including: utilizing at least one processor to execute computer code that performs the steps of: receiving motion sensor information from a plurality of sensors on a wearable device; identifying, based on the motion sensor information, a motion pattern corresponding to an activity of a user; comparing the motion pattern to a plurality of stored motion patterns; determining, based on the comparing, if the motion pattern matches one of the stored motion patterns that is identified as a motion pattern of a sensitive activity; and modifying, whether the motion pattern matches one of the stored motion pattern identified as a motion pattern of a sensitive activity. Other aspects are described and claimed.

20 Claims, 3 Drawing Sheets

(56) References Cited

OTHER PUBLICATIONS

David Robertson, "Watch Out: If You've Got a SmartWatch, Hackers Could Get Your Data", ECE Illinois, Sep. 10, 2015, 4 pages, Accessed on May 12, 2016, Copy available at: www.ece.illinois.edu/newsroom/article/11762.

Marian Harbach et al., "Using Personal Examples to Improve Risk Communication for Security and Privacy Decisions", CHI 2014, Apr. 26-May 1, 2014, Toronto, ON, Canada, 10 pages, ACM Digital Library.

Hazim Almuhimedi et al., "Your Location has been Shared 5,398 Times!", A Field Study on Mobile App Privacy Nudging, CMU-ISR-14-116, Dec. 2014, 25 pages, School of Computer Science, Carnegie Mellon University, Pittsburgh, PA, USA.

Rebecca Balebako et al., "Little Brothers Watching You: Raising Awareness of Data Leaks on Smartphones", Symposium on Usable Privacy and Security (SOUPS), Jul. 24-26, 2013, Newcastle, UK, 14 pages.

Permission Manager, Android Apps on Google Play, 4 pages, Accessed on Apr. 4, 2016, Copy available at: https://play.google.com/store/apps/details?id=com.appaholics.applauncher&hl=en.

Supriyo Chakraborty et al., "ipShield: A Framework for Enforcing Context-Aware Privacy", 11th USENIX Symposium on Networked Systems Design and Implementation (NSDI '14), Apr. 2-4, 2014, Seattle, WA, USA, 15 pages, USENIX Association.

\* cited by examiner

MOTION INFORMATION FILTERING

BACKGROUND

Some applications installed on information handling devices (e.g., smart watches, tablets, laptop computers, smart televisions, etc.) gather information from sensors of the device. For example, an application may request location information relating to the global positioning system coordinates of the device. Some applications use this information to personalize the application. For example, if a user performs a web search for restaurants, the web search engine may use the location information to provide search results that are tailored to the location. However, some applications access and mine the information to sell it to other entities. The increase in wearable and portable information handling devices (e.g., smart watches, head-mounted displays, tablets, laptop computers, etc.), has allowed applications access to even more information relating to users and their habits.

SUMMARY

In summary, one aspect of the invention provides a method, comprising: utilizing at least one processor to execute computer code that performs the steps of: receiving motion sensor information from a plurality of sensors on a wearable device; identifying, based on the sensor information, a motion pattern corresponding to an activity of a user; comparing the motion pattern to a plurality of stored motion patterns; determining, based on the comparing, whether the motion pattern matches one of the stored motion pattern identified as a motion pattern of a sensitive activity; and modifying, if the motion pattern matches one of the stored motion patterns, the motion sensor information before provision to an application.

Another aspect of the invention provides an apparatus, comprising: at least one processor; and a computer readable storage medium having computer readable program code embodied therewith and executable by the at least one processor, the computer readable program code comprising: computer readable program code that receives motion sensor information from a plurality of sensors on a wearable device; computer readable program code that identifies, based on the motion sensor information, a motion pattern corresponding to an activity of a user; computer readable program code that compares the motion pattern to a plurality of stored motion patterns; computer readable program code that determines, based on the comparing, whether the motion pattern matches one of the stored motion pattern identified as a motion pattern of a sensitive activity; and computer readable program code that modifies, if the motion pattern matches one of the stored motion patterns, the motion sensor information before provision to an application.

An additional aspect of the invention provides a computer program product, comprising: a computer readable storage medium having computer readable program code embodied therewith, the computer readable program code comprising: computer readable program code that receives motion sensor information from a plurality of sensors on a wearable device; computer readable program code that identifies, based on the motion sensor information, a motion pattern corresponding to an activity of a user; computer readable program code that compares the motion pattern to a plurality of stored motion patterns; computer readable program code that determines, based on the comparing, whether the motion pattern matches one of the stored motion pattern identified as a motion pattern of a sensitive activity; and computer readable program code that modifies, if the motion pattern matches one of the stored motion patterns, the motion sensor information before provision to an application.

A further aspect of the invention provides a method, comprising: receiving motion sensor information from a plurality of sensors of a wearable device of a user, wherein the motion sensor information is being provided to an application; identifying that the motion sensor information matches a previously stored motion pattern designated as corresponding to a sensitive activity of a user; and filtering the motion sensor information before provisioning it to the application.

For a better understanding of exemplary embodiments of the invention, together with other and further features and advantages thereof, reference is made to the following description, taken in conjunction with the accompanying drawings, and the scope of the claimed embodiments of the invention will be pointed out in the appended claims.

DETAILED DESCRIPTION

Figure 1:
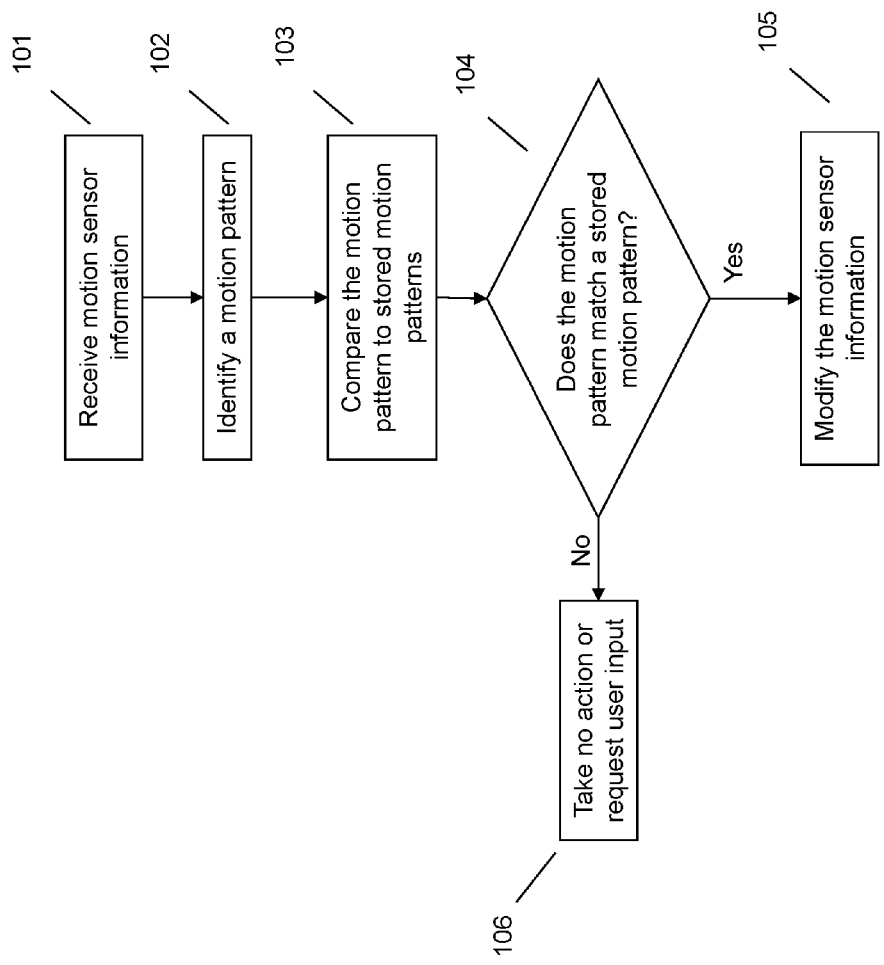
FIG. 1 illustrates a method of motion information filtering.

It will be readily understood that the components of the embodiments of the invention, as generally described and illustrated in the figures herein, may be arranged and designed in a wide variety of different configurations in addition to the described exemplary embodiments. Thus, the following more detailed description of the embodiments of the invention, as represented in the figures, is not intended to limit the scope of the embodiments of the invention, as claimed, but is merely representative of exemplary embodiments of the invention.

Reference throughout this specification to "one embodiment" or "an embodiment" (or the like) means that a particular feature, structure, or characteristic described in connection with the embodiment is included in at least one embodiment of the invention. Thus, appearances of the phrases "in one embodiment" or "in an embodiment" or the like in various places throughout this specification are not necessarily all referring to the same embodiment.

Furthermore, the described features, structures, or characteristics may be combined in any suitable manner in at least one embodiment. In the following description, numerous specific details are provided to give a thorough understanding of embodiments of the invention. One skilled in the relevant art may well recognize, however, that embodiments of the invention can be practiced without at least one of the specific details thereof, or can be practiced with other methods, components, materials, et cetera. In other instances, well-known structures, materials, or operations are not shown or described in detail to avoid obscuring aspects of the invention.

The illustrated embodiments of the invention will be best understood by reference to the figures. The following description is intended only by way of example and simply illustrates certain selected exemplary embodiments of the invention as claimed herein. It should be noted that the flowchart and block diagrams in the figures illustrate the architecture, functionality, and operation of possible implementations of systems, apparatuses, methods and computer program products according to various embodiments of the invention. In this regard, each block in the flowchart or block diagrams may represent a module, segment, or portion of code, which comprises at least one executable instruction for implementing the specified logical function(s).

It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Specific reference will be made here below to FIGS. 1-2. It should be appreciated that the processes, arrangements and products broadly illustrated therein can be carried out on, or in accordance with, essentially any suitable computer system or set of computer systems, which may, by way of an illustrative and non-restrictive example, include a system or server such as that indicated at 12' in FIG. 3. In accordance with an example embodiment, most if not all of the process steps, components and outputs discussed with respect to FIGS. 1-2 can be performed or utilized by way of a processing unit or units and system memory such as those indicated, respectively, at 16' and 28' in FIG. 3, whether on a server computer, a client computer, a node computer in a distributed network, or any combination thereof.

Information handling devices have access to large amounts of information relating to a user and the user's habits. Additionally, the increase of sensors integrated into the devices allows the devices to identify even more information. For example, a smart watch having only a global positioning system (GPS) sensor can only identify the location of the device. However, a smart watch having motion sensors in addition to the GPS sensor not only allows the device to identify the location of the device, but also the orientation and movement of the device. The addition of these sensors has many practical applications. For example, using the orientation and movement information allows the device to perform additional functions, for example, deactivating the touch screen when the device is held in a certain position.

However, because the sensors allow the device to make inferences about the user and the user's habits, the information captured by the sensors can be used in detrimental ways. For example, a hacker could access the information produced by motion sensors on the device to identify that a user is typing. The motion sensor information can then be combined with known keyboard patterns to determine what specifically the user is typing. Such a technique could be used to steal a user's confidential information, for example, credit card information, logon and password, identifying information, and the like. In addition, because the sensors are constantly capturing information even when the user is not using the device, applications can make inferences about a user's habits and activities that the user may not be willing to share. For example, by using motion sensors, a device can identify when a user is sleeping, eating, driving, and the like. While this information may not necessarily be confidential, a user may not want this information known or shared with applications on the devices or other entities.

Currently, applications only allow a user to provide generic permissions. For example, to install or use the application, a user may have to allow the application to have permission to capture sensor information. However, the application either captures or has access to the sensor information at all times. The user cannot set the permissions to only allow access at particular times (e.g., while the application is running, during the day, and the like). Thus, the application can access the sensor information at all times and either use the sensor information, sell the sensor information, store the sensor information, or the like. Even if the application does not sell or otherwise transfer the sensor information to another entity, the application may be hacked which may allow another entity to obtain the sensor information.

Some devices allow a user to set rules regarding whether and when the sensors collect information. For example, a user may turn off sensors at a particular time of day, when a particular application is running, and the like. These rules prevent the sensors from collecting information, thus, preventing the applications from obtaining any sensor information. However, such rules completely prevent the capturing of sensor data during the period defined by the rule. The problem with this approach is that some devices need to have access to sensor data at all times or periodically throughout the day which cannot be defined by a rule. For example, if a user has an activity tracker, the activity tracker needs access to the motion sensor data at all times or the activity will not be tracked. Thus, using a rule-based approach is not practical for all devices.

Accordingly, an embodiment provides a method of filtering motion sensor information before provision to an application. An embodiment may receive motion sensor information from a plurality of sensors on an information handling device. This motion sensor information may be requested by an application or otherwise may be being transferred to an application. Before provision to the application, the motion sensor information may be used by an embodiment to identify a motion pattern corresponding to an activity of a user. If the motion pattern, when compared to previously stored motion patterns, matches a motion pattern which has been identified as a motion pattern of a sensitive activity, an embodiment may modify the motion sensor information before providing it to the requesting application. In modifying the motion sensor information an embodiment may filter, suppress, scramble, or otherwise change the motion sensor information. Thus, the application will not receive the actual motion sensor information of the user and will be prevented from receiving information related to sensitive or private information of the user.

In one embodiment the previously stored motion patterns may be stored in a database which includes motion patterns from a plurality of users. As users indicate that motion patterns associated with activities of the user are sensitive or should not be shared, the motion pattern may be added to the database or other type of storage repository. Information and motion patterns from similar pattern types (e.g., a pattern associated with a user typing, a pattern associated with a user sleeping, etc.) may be clustered. From the clustered pattern types an embodiment may find or generate a representative pattern template for that pattern type. These templates may then be used by an embodiment to identify whether motion sensor information captured from sensors fall under the category of sensitive or restricted activities.

Such a system provides a technical improvement over current systems for protecting the privacy and information of a user related to applications. The system provides a method for filtering motion sensor information before provisioning it to an application. Rather than allowing an application to have access to all sensor information, the systems and methods as described herein may modify motion sensor information that the system has identified as sensitive or that a user has identified as private. Additionally, as opposed to a rule-based approach for determining whether the sensor information should captured and shared with applications, the systems and methods as described herein provide a data-driven approach. In other words, rather than suppressing sensor information based upon a particular time of day, the approaches described herein modify the motion information if the motion pattern matches a pattern which has previously been identified as sensitive or private. Thus, the applications have access to less motion sensor information, thereby increasing the amount of privacy afforded to a user.

Referring now to FIG. 1, at 101, an embodiment may receive motion sensor information from a plurality of sensors on an information handling device. For ease of understanding, embodiments described herein reference wearable information handling devices such as smart watches, heads-up displays, fitness bands, activity trackers, and the like. However, as can be understood by one skilled in the art, the methods and systems as described herein can be applied to any device which can access or produce motion sensor information.

The sensors may include accelerometers, gyroscopes, electromyography sensors, pressure sensors, GPS sensors, and other sensors which provide motion information. In a typical application this sensor information may be used by a device to determine not only information about the device (e.g., how the device is oriented, where the device is located, how the device is being used, etc.), but may also be used to determine actions or activities performed by the user. For example, the motion sensor information may be used by a device to distinguish gestures performed by the user, activities the user is performing, the location of the user, motion of the user, and the like. Applications installed on the device may request the motion sensor information from the sensors. Before provisioning the motion sensor information to the application, the motion sensor information may be submitted to, obtained by, or redirected to the system as described by an embodiment.

At 102, an embodiment may identify, using the motion sensor information, a motion pattern corresponding to an activity of a user. The activity of the user may not be specifically identified by an embodiment. Rather, an embodiment may just attribute the motion pattern to a general activity of the user. For example, an embodiment may ascribe a motion pattern to a user moving rather than distinguishing between walking and running. Alternatively, an embodiment may not identify the activity at all. Rather, an embodiment may just identify that the motion pattern corresponds to a user activity rather than being just noise or other extraneous sensor information. The motion pattern may also comprise a running stream of sensor information. In other words, the motion pattern may not have a definitive beginning and ending in order to perform the following steps. The motion pattern and comparison may be based upon a continual stream of information.

An embodiment may then compare the motion pattern to a plurality of stored motion patterns at 103. The stored motion patterns may be stored locally on the device or in a remote storage location accessible by the device. For example, the motion patterns may be stored in cloud storage that the device can access or communicate with. The motion patterns may also be stored in a combination of local and remote storage locations. For example, the stored motion patterns may be stored remotely in a main repository or database and also locally on the user's device. The local database of the user's device having stored motion patterns may be updated when the main repository is modified or updated. The stored motion patterns may be stored in a main repository which houses all the motion patterns and motion sensor information. Only a subset of the motion pattern information may then be stored locally on a user's device. For example, the motion patterns most frequently matched to the user may be stored on the user's device. As another example, only the motion pattern templates, as described in more detail below, may be stored on the user's device.

In comparing the motion pattern to the stored motion patterns, an embodiment may match the motion pattern to the stored motion patterns using dynamic time warping, hidden Markov models, and the like. Additionally, an embodiment, to make a comparison, may split the motion patterns into different time windows. The time window may be determined based upon the minimum time domain that is needed to detect each pattern and characteristics of the pattern. For example, if the stored motion pattern corresponds to an activity that takes ten seconds, the motion pattern may be split into ten second windows to make the comparison. In splitting the patterns into time windows, an embodiment may identify a starting point of the motion pattern that matches or shares similarities to a stored motion pattern. The time window may then be based upon this starting point.

The plurality of stored motion patterns may include a database that is populated with information from a plurality of users. In such a case the database may be accessible by many different devices. As a user identifies a motion pattern, the pattern may be added to the database. An embodiment may then cluster the motion sensor information that corresponds to similar or the same pattern types. In identifying similar pattern types, an embodiment may identify characteristics of the motion pattern that are similar. As an example, the system may cluster all motion sensor information that corresponds to a user moving as opposed to a user typing. Once the motion sensor information is clustered by pattern type, an embodiment may generate or find a representative template for each pattern type. The representative template may correspond to a motion pattern that is typical for the pattern type. Generation of the representative template may allow more motion patterns to be identified as matching or corresponding to the template, rather than requiring an exact match to a stored motion pattern.

The stored motion patterns may also contain additional information. For example, the stored motion patterns may have an activity associated with them. The user, when uploading or submitting the motion pattern to the repository, may provide an identification of the activity corresponding to the motion pattern. The stored motion patterns may have a frequency of observation associated with them. For example, a stored motion pattern may be a pattern that is observed from many different users or multiple times from different users. As an example, a motion pattern associated with a user eating may be observed from all the other users multiple times a day.

As another example, the motion patterns may have a threat level associated with them. When the user uploads the motion pattern the user may be prompted to provide a threat level to be associated with the motion pattern. For example, if the motion pattern is associated with the activity of entering a password, the user may provide a threat level of "High." The threat level may be a numerical value (e.g., ranked on a scale of 1-5), a color value (e.g., red, orange, green, yellow, etc.), a word value (e.g., "Low," "Medium," "High," etc.), or another threat value. The user may select the threat level from a pre-populated list or selection window. Alternatively, the threat value may be customizable by the user and the system may then correlate the different threat values to a single threat value. As an example, the system may identify 5, red, and "High" as all being the highest threat value.

An embodiment may then rank or sort the stored motion patterns by threat level, frequency of use, or another characteristic, for ease in identifying received motion patterns. For example, motion patterns having a high frequency of use may be accessed first in determining whether the user motion pattern matches a stored motion pattern. As another example, if the motion patterns are ranked based upon threat level, an embodiment may use this ranking to determine whether the motion pattern of the user matches or exceeds a particular setting of the user. For example, the user may set the system on their device to a particular threat level. If a motion pattern of the user matches a stored motion pattern which has the same or higher threat level as that set by the user, then an embodiment will take additional action as described below.

If the motion pattern does not match a stored motion pattern at 104, an embodiment may take no action at 106. In other words, the motion sensor information may not be modified or filtered as discussed below. Alternatively, an embodiment may request user input at 106. The system may request that the user identify whether the motion pattern of the user should be considered sensitive or private. If the user indicates that the motion pattern should be identified as a motion pattern of a sensitive activity, the user may additionally be prompted to enter additional information about the motion pattern. For example, the user may be requested to enter a threat level, identification, or the like associated with the motion pattern. As an example, if the motion pattern is associated with the activity of eating, the user may enter an identification that the motion pattern is "eating" and the threat level is "medium." The motion pattern may then be uploaded to the repository or database whether locally or remotely.

If the motion pattern does match a stored motion pattern at 104, an embodiment may modify the motion sensor information at 105. In modifying the motion sensor information, an embodiment may scramble or randomize the sensor information. For example, rather than supplying the actual sensor information random sensor information may be provided. Other forms of modifying the motion sensor information are possible. For example, the motion sensor information may be suppressed by changing the values of the sensor information to zeros or other defined NULL values. Another example includes the sensor information being filtered. For example, all high and low values may be reduced to other values. Additionally, the user may be notified that the motion filtering system is modifying the sensor information. The user may additionally be notified of the reason that the sensor information is being modified. The user may then be able to override the modification of the sensor information. For example, the user may not want the sensor information to be modified. The modified sensor information may then be provided to the application or applications that are requesting or have access to the motion sensor information.

When the end of the motion pattern is detected, the motion filtering system may stop modifying the motion sensor information. The applications that are requesting or have access to the motion sensor information may then be provided with the actual motion sensor information. The user may also be notified that the motion sensor information is no longer being modified. The user may also provide input to confirm that the sensitive activity has been completed. This may ensure that the applications are not inadvertently provided motion sensor information which corresponds to a sensitive activity.

Figure 2:
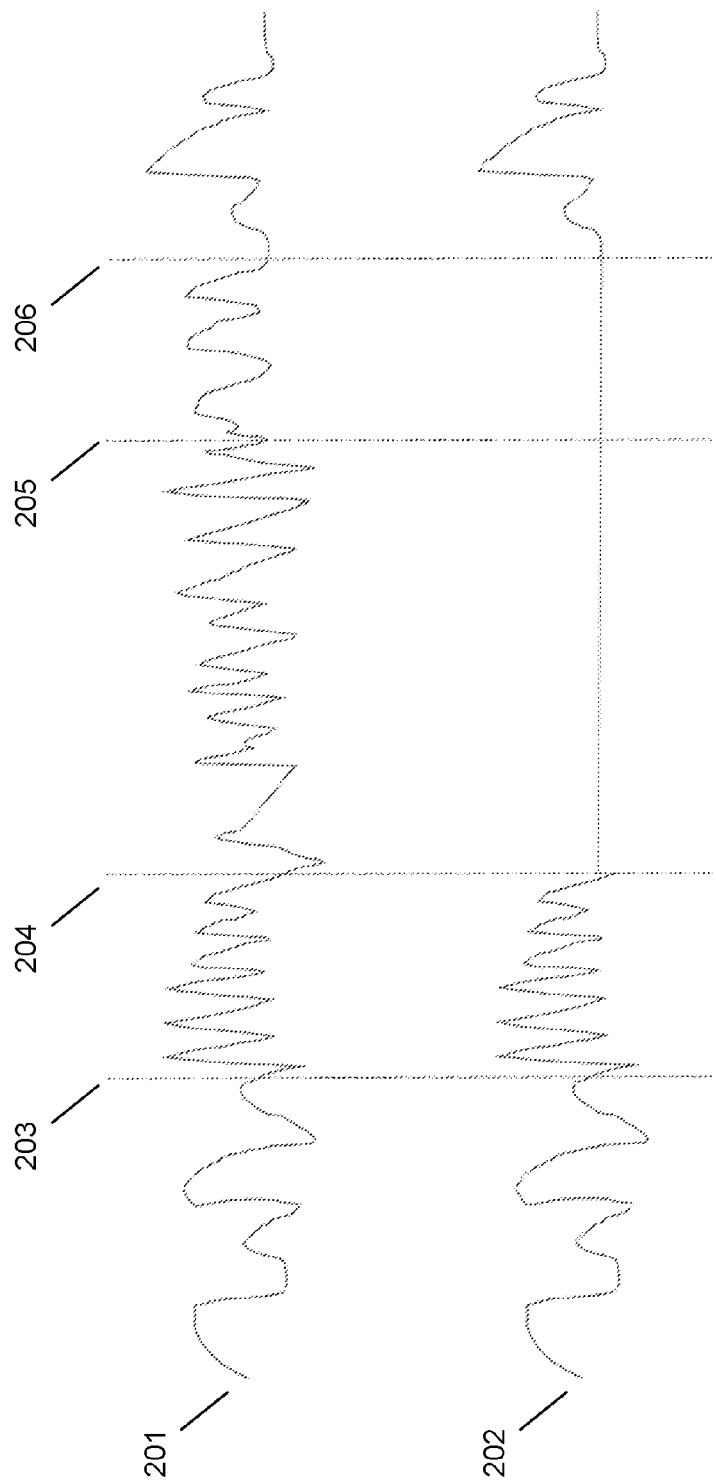
FIG. 2 illustrates an example of filtered output of motion sensor information.

As an overall example, referring to FIG. 2, the actual sensor output may correspond to the graph of 201. The modified motion sensor information as provided to an application may correspond to the graph at 202. At point 203, the system may detect that the user is typing. At point 204, the system may determine that the motion pattern between 203 and 204 is similar to a stored motion pattern. Even though the actual sensor output 201 after point 204 reflects that the user is still typing, the motion sensor information provided to the application 202 is filtered as shown by the flat line. When the system detects that the user stops typing at point 205, a delay in providing the actual sensor output is seen between 205 and 206. At 206 the actual sensor output 201 and the motion sensor information as provided to an application 202 match. In other words, the system stops filtering the motion sensor information and provides the actual sensor output 201 to the application.

Figure 3:
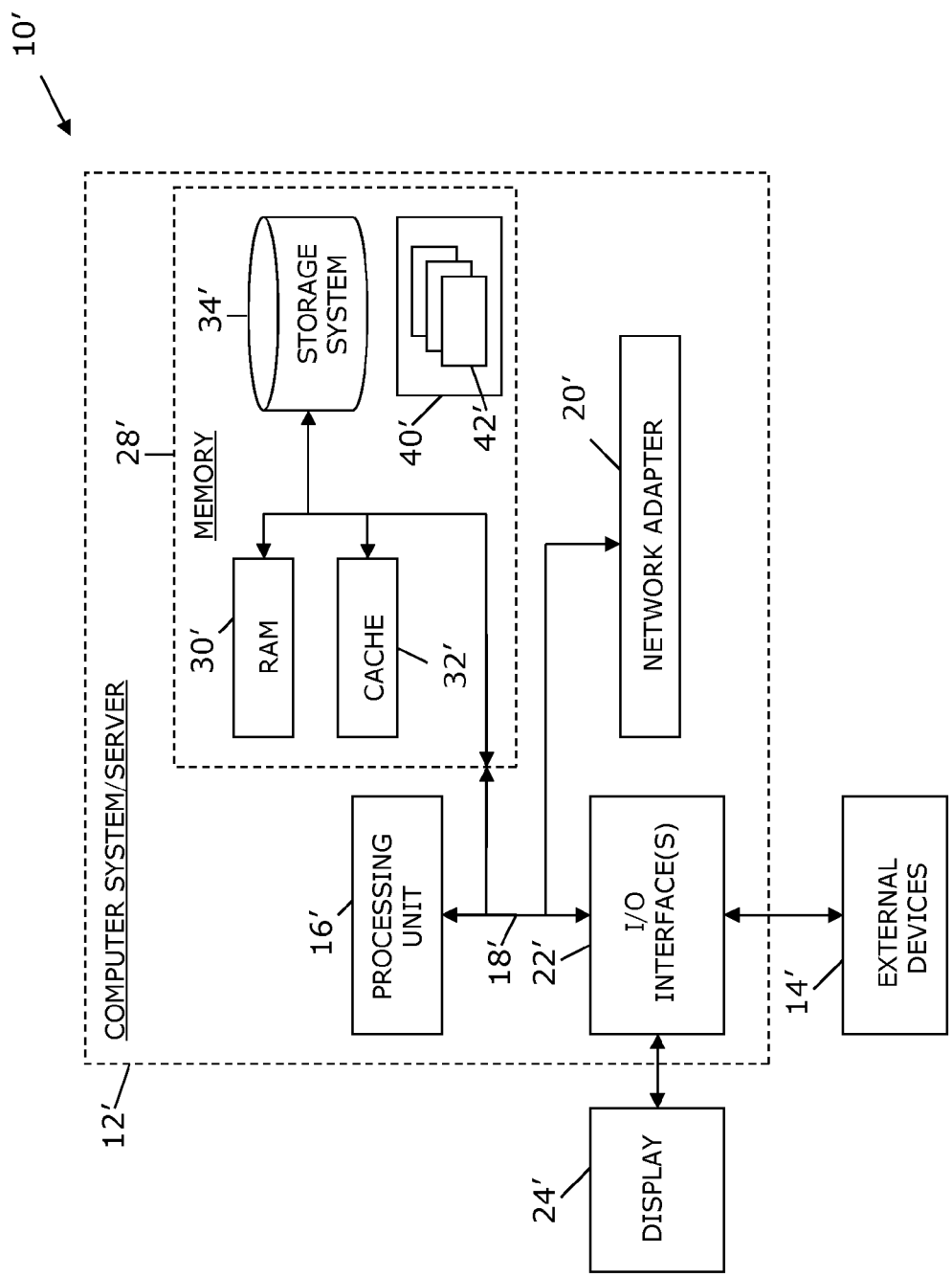
FIG. 3 illustrates a computer system.

As shown in FIG. 3, computer system/server 12' in computing node 10' is shown in the form of a general-purpose computing device. The components of computer system/server 12' may include, but are not limited to, at least one processor or processing unit 16', a system memory 28', and a bus 18' that couples various system components including system memory 28' to processor 16'. Bus 18' represents at least one of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12' typically includes a variety of computer system readable media. Such media may be any available media that are accessible by computer system/server 12', and include both volatile and non-volatile media, removable and non-removable media.

System memory 28' can include computer system readable media in the form of volatile memory, such as random access memory (RAM) 30' and/or cache memory 32'. Computer system/server 12' may further include other removable/non-removable, volatile/non-volatile computer system storage media. By way of example only, storage system 34' can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18' by at least one data media interface. As will be further depicted and described below, memory 28' may include at least one program product having a set (e.g., at least one) of program modules that are configured to carry out the functions of embodiments of the invention.

Program/utility 40', having a set (at least one) of program modules 42', may be stored in memory 28' (by way of example, and not limitation), as well as an operating system, at least one application program, other program modules, and program data. Each of the operating systems, at least one application program, other program modules, and program data or some combination thereof, may include an implementation of a networking environment. Program modules 42' generally carry out the functions and/or methodologies of embodiments of the invention as described herein.

Computer system/server 12' may also communicate with at least one external device 14' such as a keyboard, a pointing device, a display 24', etc.; at least one device that enables a user to interact with computer system/server 12'; and/or any devices (e.g., network card, modem, etc.) that enable computer system/server 12' to communicate with at least one other computing device. Such communication can occur via I/O interfaces 22'. Still yet, computer system/server 12' can communicate with at least one network such as a local area network (LAN), a general wide area network (WAN), and/or a public network (e.g., the Internet) via network adapter 20'. As depicted, network adapter 20' communicates with the other components of computer system/server 12' via bus 18'. It should be understood that although not shown, other hardware and/or software components could be used in conjunction with computer system/server 12'. Examples include, but are not limited to: microcode, device drivers, redundant processing units, external disk drive arrays, RAID systems, tape drives, and data archival storage systems, etc.

This disclosure has been presented for purposes of illustration and description but is not intended to be exhaustive or limiting. Many modifications and variations will be apparent to those of ordinary skill in the art. The embodiments were chosen and described in order to explain principles and practical application, and to enable others of ordinary skill in the art to understand the disclosure.

Although illustrative embodiments of the invention have been described herein with reference to the accompanying drawings, it is to be understood that the embodiments of the invention are not limited to those precise embodiments, and that various other changes and modifications may be affected therein by one skilled in the art without departing from the scope or spirit of the disclosure.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method, comprising:
utilizing at least one processor to execute computer code that performs the steps of:
receiving motion sensor information from a plurality of sensors on a wearable device;
identifying, based on the motion sensor information, a motion pattern corresponding to an activity of a user;
comparing the motion pattern to a plurality of stored motion patterns, wherein the comparing comprises splitting the motion pattern into a plurality of time windows corresponding to a time window of at least one of the stored motion pattern and identifying a starting point of the motion pattern by matching characteristics of the motion pattern to the at least one stored motion pattern;
determining, based on the comparing, whether the motion pattern matches one of the stored motion pattern identified as a motion pattern of a sensitive activity, wherein the determining comprises matching characteristics of the motion pattern to characteristics of a template representing a motion pattern identified as corresponding to a sensitive activity, wherein the template is generated by clustering motion sensor information, received from a plurality of devices, having similar characteristics, identifying a pattern type for the clustered motion sensor information, and generating a template for the identified pattern type; and
modifying, based upon the motion pattern matching one of the stored motion patterns, the motion sensor information before provision to an application.

2. The method of claim 1, comprising determining that the motion pattern does not match one of the stored motion patterns.

3. The method of claim 2, comprising requesting that the user identify if the motion pattern should be identified as a motion pattern of a sensitive activity.

4. The method of claim 3, comprising receiving user input indicating that the motion pattern should be identified as a motion pattern of a sensitive activity and prompting the user to set a threat level for the motion pattern.

5. The method of claim 1, comprising receiving a user input setting a threat level for motion filtering.

6. The method of claim 5, wherein the determining comprises determining whether the motion pattern matches one of the stored motion patterns matching the threat level set by the user and wherein the modifying comprises modifying the motion sensor information based upon the motion pattern matching the threat level.

7. The method of claim 1, wherein the motion sensor information is received from a plurality of users having wearable devices.

8. The method of claim 7, comprising clustering the motion sensor information from the plurality of users based upon a pattern type and generating a representative pattern template for each pattern type.

9. The method of claim 8, wherein the stored motion pattern comprises a pattern representative template.

10. The method of claim 1, wherein the modifying comprises suppressing the motion sensor information.

11. The method of claim 1, wherein the modifying comprises randomizing the motion sensor information.

12. An apparatus, comprising:
at least one processor; and
a computer readable storage medium having computer readable program code embodied therewith and executable by the at least one processor, the computer readable program code comprising:
computer readable program code that receives motion sensor information from a plurality of sensors on a wearable device;
computer readable program code that identifies, based on the motion sensor information, a motion pattern corresponding to an activity of a user;
computer readable program code that compares the motion pattern to a plurality of stored motion patterns, wherein the comparing comprises splitting the motion pattern into a plurality of time windows corresponding to a time window of at least one of the stored motion pattern and identifying a starting point of the motion pattern by matching characteristics of the motion pattern to the at least one stored motion pattern;
computer readable program code that determines, based on the comparing, whether the motion pattern matches one of the stored motion pattern identified as a motion pattern of a sensitive activity, wherein the determining comprises matching characteristics of the motion pattern to characteristics of a template representing a motion pattern identified as corresponding to a sensitive activity, wherein the template is generated by clustering motion sensor information, received from a plurality of devices, having similar characteristics, identifying a pattern type for the clustered motion sensor information, and generating a template for the identified pattern type; and computer readable program code that modifies, based upon the motion pattern matching one of the stored motion patterns, the motion sensor information before provision to an application.

13. A computer program product, comprising:

a computer readable storage medium having computer readable program code embodied therewith, the computer readable program code comprising:

computer readable program code that receives motion sensor information from a plurality of sensors on a wearable device;

computer readable program code that identifies, based on the motion sensor information, a motion pattern corresponding to an activity of a user;

computer readable program code that compares the motion pattern to a plurality of stored motion patterns, wherein the comparing comprises splitting the motion pattern into a plurality of time windows corresponding to a time window of at least one of the stored motion pattern and identifying a starting point of the motion pattern by matching characteristics of the motion pattern to the at least one stored motion pattern;

computer readable program code that determines, based on the comparing, whether the motion pattern matches one of the stored motion pattern identified as a motion pattern of a sensitive activity, wherein the determining comprises matching characteristics of the motion pattern to characteristics of a template representing a motion pattern identified as corresponding to a sensitive activity, wherein the template is generated by clustering motion sensor information, received from a plurality of devices, having similar characteristics, identifying a pattern type for the clustered motion sensor information, and generating a template for the identified pattern type; and computer readable program code that modifies, based upon the motion pattern matching one of the stored motion patterns, the motion sensor information before provision to an application.

14. The computer program product of claim 13, comprising computer readable program code that determines that the motion pattern does not match one of the stored motion patterns.

15. The computer program product of claim 14, comprising computer readable program code that requests that the user identify if the motion pattern should be identified as a motion pattern of a sensitive activity.

16. The computer program product of claim 15, comprising computer readable program code receives user input indicating that the motion pattern should be identified as a motion pattern of a sensitive activity and computer readable program code that prompts the user to set a threat level for the motion pattern.

17. The computer program product of claim 13, wherein the motion sensor information is received from a plurality of users having wearable devices.

18. The computer program product of claim 17, comprising computer readable program code that clusters the motion sensor information from the plurality of users based upon a pattern type and computer readable program code that generates a representative pattern template for each pattern type.

19. The computer program product of claim 18, wherein the stored motion pattern comprises a pattern representative template.

20. A method, comprising:

receiving motion sensor information from a plurality of sensors of a wearable device of a user, wherein the motion sensor information is being provided to an application;

identifying that the motion sensor information matches a previously stored motion pattern designated as corresponding to a sensitive activity of a user, wherein the identifying comprises splitting the motion sensor information into a plurality of time windows corresponding to a time window of the previously stored motion pattern and identifying a starting point of the motion sensor information by matching characteristics of the motion sensor information to characteristics of a template representing the previously stored motion pattern designated as corresponding to a sensitive activity, wherein the template is generated by clustering motion sensor information, received from a plurality of devices, having similar characteristics, identifying a pattern type for the clustered motion sensor information, and generating a template for the identified pattern type; and filtering the motion sensor information before provisioning it to the application.

* * * * *